Figure 1:
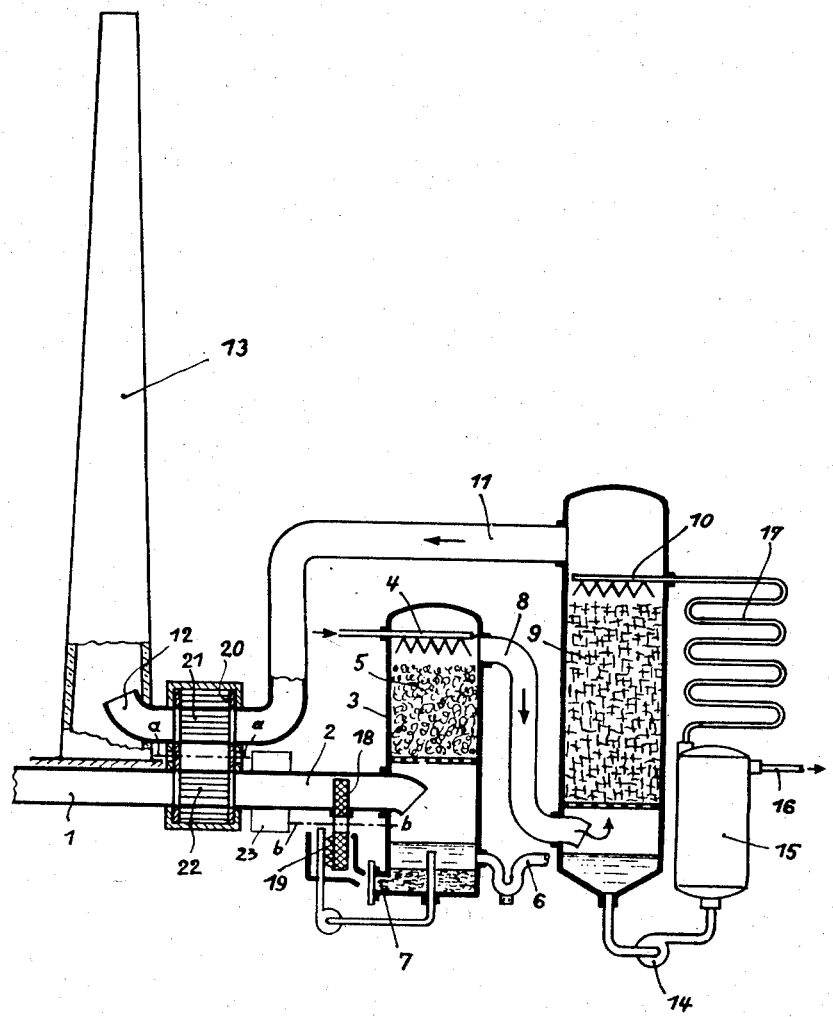

July 15, 1958 R. VON LINDE 2,843,217
GAS SEPARATING PLANT
Filed Feb. 9, 1953 2 Sheets-Sheet 1

INVENTOR
Robert von Linde
by Pierce, Scheffler & Parker
ATTORNEYS

July 15, 1958 R. VON LINDE 2,843,217
GAS SEPARATING PLANT
Filed Feb. 9, 1953 2 Sheets-Sheet 2

INVENTOR
Robert von Linde
BY Pierce, Scheffler & Parker
ATTORNEYS

United States Patent Office 2,843,217
Patented July 15, 1958

2,843,217

GAS SEPARATING PLANT

Robert von Linde, Planegg, near Munich, Germany

Application February 9, 1953, Serial No. 335,685

Claims priority, application Germany February 21, 1952

3 Claims. (Cl. 183—34)

This invention relates to a plant for disposing of hot waste gases of large roasting and combustion plants containing a substantial amount of sulphurous constituents.

A special object of the invention is to provide simple means for cooling the waste gases to a temperature adapted for the separating treatment, even where sufficient quantities of cooling water are not available.

The main object of the invention is to ensure the dispersing in the atmosphere of the processed waste gases in such a way that danger to the operators and other persons in the vicinity of the plant by stagnant gas layers which are poor in oxygen is safely avoided.

A still further object of the invention is to provide a plant adapted to meet said objects and being of simple construction and operation, involving low cost of installation and operation.

With these and further objects in view, according to the present invention the heat withdrawn from the hot gas flowing to the separator is supplied to the gas current leaving the separator. It will thus be understood that I use as a cooling agent the processed gas itself which leaves the separator, for instance, the washer or the absorber, for withdrawing heat from the hot gas current and permitting the carrying out of washing and absorption processes. Since the washed-out cold residual gas absorbs a considerable part of the heat withdrawn from the hot gas, a sufficiently large amount of lift or buoyancy is available for leading off even the waste gas quantities occurring in very large plants, for instance, through a sufficiently high chimney.

In order to facilitate the exchange of heat between the hot and the cold gases and to reduce the surface area required therefor, said exchange is achieved by passing the hot gas flowing to the separator over a heat-absorbing substance and using the amount of heat accumulated therein for reheating the gas current leaving the separator. Such heating apparatuses are known per se, especially in connection with blast furnaces. Particularly adapted in connection with my novel method and plant is a device in which the material serving for the exchange of heat is arranged on a conveyor device by which it is alternately moved into the hot gas duct for absorption of heat and into the cold gas duct for delivery of heat.

Where the tangible heat of the smoke or waste gases has been substantially transmitted to the treated gas without change of the water content thereof, a further cooling of the gas before it enters into the absorption plant oftentimes can be renounced. Thus the deficiencies resulting by the acid constituents of the gas by acidification of the cooling water or separation of such constituents are avoided.

In order to further reduce the temperature I may introduce water behind the heat exchanger up to saturation of the gases. This water will evaporate with cooling of the gases. A slight excess of water is preferred so as to carry off the salts contained in the water.

Other objects of the invention are such as may be attained by a utilization of the various combinations and principles hereinafter set forth in the varied relations to which they are obviously applicable by those skilled in the art.

The invention will be best understood and further objects will appear from a study of the following description taken in connection with the accompanying drawings, with the understanding, however, that the invention is not confined to any strict conformity with the showing in the drawings, but may be changed and modified as long as such changes mark no material departure from the salient features of the invention as expressed in the appended claims.

Figure 2:
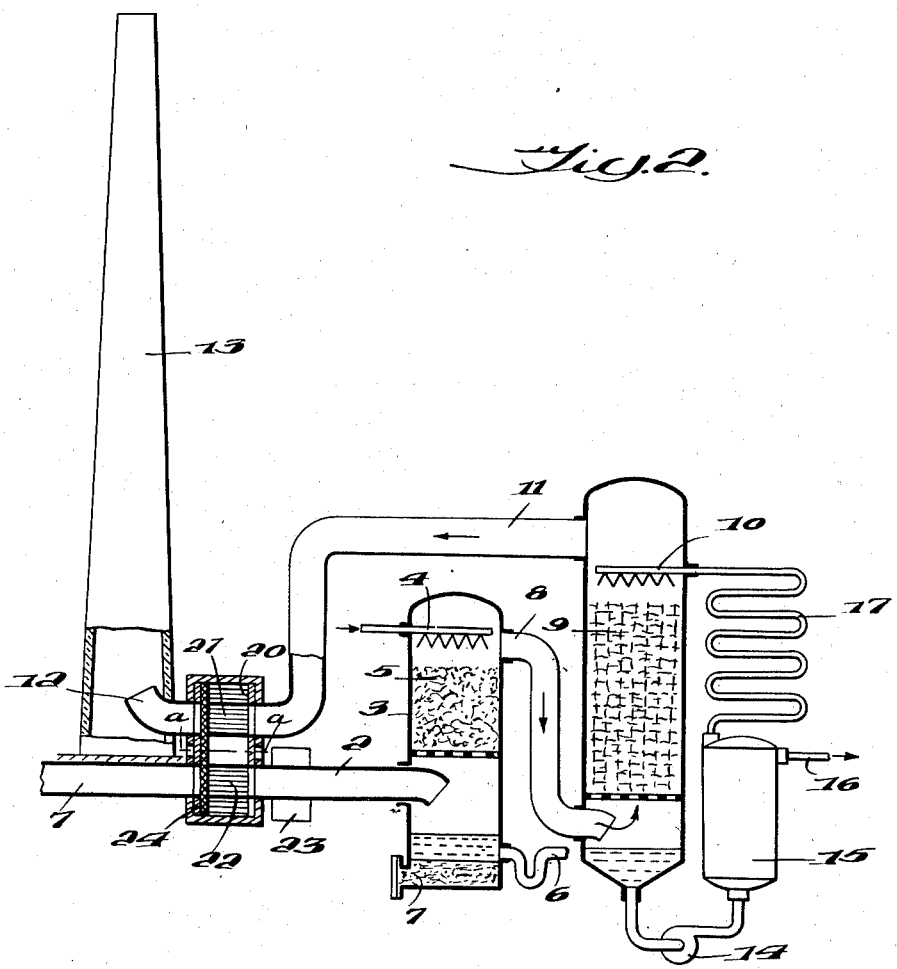

In the drawings:

Fig. 1 is a diagrammatic side elevation, with part of the front walls removed to reveal interiors, of a complete waste gas treating plant and Fig. 2 is a similar diagrammatic side elevation of a slightly modified plant in which the filter is combined with the heat exchanger.

Referring to Fig. 1, the waste gas escaping from a combustion or roasting plant (not shown) with a temperature of about 250° C. and containing sulphur dioxide, is delivered through a pipe or duct 1, 2. The section 2 of the pipe terminates in a washing cooler 3 to which cold water is supplied through a sprinkler pipe 4. This water is distributed over trickling bodies 5 which may consist, for instance, of so-called "Raschig rings," and is drawn off through a siphon 6 arranged above the bottom of the cooler. The solids washed out of the gas (dust and ash) can be discharged from a sludge drain or discharge pipe 7.

The gas which has been purified in the washing cooler 3 and freed from the residual heat by a small amount of cooling water passes through a pipe 8 into an absorber 9 to which is supplied a solution of absorbents, for instance, an aqueous solution of ammonia, through a sprinkling device 10. Connected to this absorber is a gas pipe 11, 12, whose section 12 issues into a chimney 13. The "rich" solution collected on the bottom of the absorber 9 is passed through a circulating pump 14 into a generator or still 15 in which the absorbed gas constituents, e. g., sulphur dioxide, are expelled from the solution. The pure gas thus obtained is drawn off through pipe 16 while the absorbent solution is recirculated through a cooler 17 into the sprinkling apparatus 10, so that it can again absorb gas constituents in the absorber 9 which can be generated in the generator 15 in the form of pure gas.

Inserted between the pipe sections 1 and 12 on the one side and the pipe sections 2 and 11 on the other side is a heat exchanger through which the heat withdrawn from the hot gas is supplied to the cold residual gas escaping from the absorber 9. According to the shown embodiment of the invention the heat exchanger consists of a drum or rotor 20 adapted to be intermittently rotated, each time through 180°, about a shaft $a$—$a$ and comprising chamber 22 which is filled with heat-accumulating substances 21 in such a way that a sufficiently large cross section is left for the passage of the gas. When the material in chamber 22 has transmitted the heat previously accumulated therein to the cold residual gas fed through pipe 11, the rotor 20 is rotated through one step of 180°, or continuously, in such a way that the heat-accumulating material can absorb new heat from the hot gas supplied from pipe 1 while the heat previously absorbed in the chamber 21 of the rotor serves to reheat the residual gas fed through pipe 11.

Mounted on a shaft $b$—$b$ which is coupled with shaft $a$—$a$ through a gear indicated at 23 is a rotary cellular filter 18 whose cells are alternately moved by the intermittent rotation of shaft b—b, into the pipe 2 and, with the next step, into the range of operation of a cleaning device 19, by which the condensates depositing from the gas in the pipe 2 owing to the heat delivered by the gas and the ash also deposited on the filter material can be removed. If desired, the filter 18 can also be constructionally combined with the moving heat exchanger 20, 21, 22 as shown in Fig. 2, or this heat exchanger may be adapted to act also as a filter, e. g., by using a heat absorbing material acting simultaneously as a filter substance or by providing one or more alternate layers of heat absorbing and filter substances in the conveyer drum 20. Instead of being arranged on a rotor, the heat accumulating material 21 and/or the filter material 18 may be arranged on another suitable conveying device, e. g., a conveyer of the paternoster type. Also the conveyer, such as the rotor 20, can be moved continuously. Such devices are known per se so that it will not be necessary to describe and illustrate them.

As illustrated in Fig. 2 the separate filter 18 and its associated parts are omitted and the heat exchanger 20, 21, 22 is associated with a filter layer 24. Otherwise the plant of Fig. 2 is the same as the plant of Fig. 1.

The cooler 4 may be dispensed with if the water contained therein or passing therethrough would combine or form depositions with the constituents of the gas. In this case, the tangible heat of the gases may be transmitted to the absorbent in the absorber 9 and withdrawn from the same by coolers, if desired. Instead of the cooler 4, I may also provide a saturating device in which the temperature is lowered, e. g., by the injection of water, with an increase of the dew point of the gases.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A plant for disposing of hot waste gases of roasting and combustion plants containing a substantial amount of sulphurous constituents, comprising in combination a separator operated with aqueous liquids adapted to absorb sulphurous constituents from the gases, a first gas duct for supplying the waste gas to the separator, a second gas duct for withdrawing the treated gas from the separator, a combined rotary regenerator and dust retaining means mounted to rotate on an axis of rotation which is symmetrically disposed between and parallel to said ducts, and means for rotating said last named means to move the heat absorbing and dust retaining material thereof alternately into the first gas duct for cooling the hot gas and retaining at least a part of the dust therefrom and into the second gas duct for reheating the cooled gas and discharging said dust, and a chimney adapted to receive the reheated gas and discharge it to the atmosphere.

2. A plant for disposing of hot waste gases containing sulphurous constituents comprising a first gas duct for hot waste gas, a first wet gas washer connected to said first duct, means for supplying wash water to and discharging wash water therefrom, a second wet gas washer connected to receive gas from said first gas washer, means for supplying said second gas washer with a liquid for absorbing sulphurous constituents from the gas, a second gas duct connected to receive the gas from said second gas washer, a chimney connected to said second gas duct, a heat regenerator mounted to rotate on an axis between said two ducts and to intersect said ducts, means for rotating said heat regenerator, and a dust filter in said first gas duct.

3. A plant for disposing of hot waste gases of roasting and combustion plants containing a substantial amount of sulphurous constituents, comprising in combination a separator operated with aqueous liquids adapted to absorb sulphurous constituents from the gases, a first gas duct for supplying the waste gas to the separator, a second gas duct for withdrawing the treated gas from the separator, a rotary regenerator mounted to rotate on an axis of rotation which is symmetrically disposed between and parallel to said ducts, and means for rotating said last named means to move the heat absorbing material thereof alternately into the first gas duct for cooling the hot gas and into the second gas duct for reheating the cooled gas, a dust filter inserted in said first duct between said heat regenerator and said separator, and a chimney adapted to receive the reheated gas and discharge it to the atmosphere.

References Cited in the file of this patent

UNITED STATES PATENTS

| 833,467 | Lamond | Oct. 16, 1906 |
| 970,519 | Lombard | Sept. 20, 1910 |
| 1,034,574 | Blane | Aug. 6, 1912 |
| 1,410,535 | Bullard | Mar. 21, 1922 |
| 1,632,572 | Willcox | June 14, 1927 |
| 1,724,421 | Richter | Aug. 13, 1929 |
| 2,134,699 | Brewster | Nov. 1, 1938 |
| 2,139,375 | Millar et al. | Dec. 6, 1938 |
| 2,216,986 | Roe | Oct. 8, 1940 |
| 2,264,221 | Smith | Nov. 25, 1941 |
| 2,297,307 | Lauber | Sept. 29, 1942 |
| 2,314,936 | Guyard | Mar. 30, 1943 |
| 2,563,415 | Pennington | Aug. 7, 1951 |
| 2,596,785 | Nelly et al. | May 13, 1952 |

OTHER REFERENCES

"A study of the absorption of sulfur dioxide from flue gases," by Keyes, Chemistry and Industry, Aug. 10, 1934, pages 694, 695.